(12) United States Patent
Zhang

(10) Patent No.: US 11,963,630 B2
(45) Date of Patent: Apr. 23, 2024

(54) STEAM-TYPE AIR FRYER

(71) Applicant: Ningbo Careline Electric Appliance Co., Ltd., Zhejiang (CN)

(72) Inventor: Yichi Zhang, Zhejiang (CN)

(73) Assignee: Ningbo Careline Electric Appliance Co., Ltd., Zhejiang (CN)

( * ) Notice: Subject to any disclaimer, the term of this patent is extended or adjusted under 35 U.S.C. 154(b) by 138 days.

(21) Appl. No.: 17/471,303

(22) Filed: Sep. 10, 2021

(65) Prior Publication Data

US 2022/0125233 A1 Apr. 28, 2022

(30) Foreign Application Priority Data

| Oct. 26, 2020 | (CN) | 202022398485.8 |
| Feb. 4, 2021 | (CN) | 202120315121.0 |
| Apr. 28, 2021 | (CN) | 202120892074.6 |
| Apr. 28, 2021 | (CN) | 202120892092.4 |
| Apr. 28, 2021 | (CN) | 202120893925.9 |

(51) Int. Cl.
*A47J 27/04* (2006.01)
*A47J 37/06* (2006.01)

(52) U.S. Cl.
CPC ........... *A47J 27/04* (2013.01); *A47J 37/0641* (2013.01); *A47J 2027/043* (2013.01)

(58) Field of Classification Search
None
See application file for complete search history.

(56) References Cited

U.S. PATENT DOCUMENTS

| 2008/0099008 | A1* | 5/2008 | Bolton et al. | A47J 37/00 126/21 A |
| 2009/0223383 | A1* | 9/2009 | Houraney | A47J 36/00 99/447 |
| 2018/0340695 | A1* | 11/2018 | Park et al. | F24C 15/32 |

FOREIGN PATENT DOCUMENTS

| CN | 102356998 A | * | 2/2012 | ............ Y02P 60/80 |
| CN | 206338780 U | * | 7/2017 | ............... F22B 1/28 |
| CN | 110141902 A | * | 8/2019 | ............ B01D 45/14 |
| CN | 110558832 A | * | 12/2019 | ............ A47J 27/04 |
| CN | 110613365 A | | 12/2019 | |
| CN | 111214131 A | * | 6/2020 | ......... A47J 37/0641 |
| EP | 3957218 A1 | | 2/2022 | |
| FR | 2640358 A1 | * | 6/1990 | ............ A47J 27/04 |
| RU | 2672831 C2 | * | 11/2018 | ......... A47J 43/0716 |
| WO | WO 2011043468 A1 | * | 4/2011 | ............... A21B 3/04 |
| WO | WO 2016129968 A1 | * | 8/2016 | ......... A47J 43/0716 |

OTHER PUBLICATIONS

Machine translation of CN 110558832 A performed on Mar. 15, 2023, Li et al. (Year: 2019).*
Machine translation of WO 2011043468 A1 performed on Mar. 15, 2023, Seguchi et al. (Year: 2011).*

(Continued)

*Primary Examiner* — Dana Ross
*Assistant Examiner* — Kevin Guanhua Wen
(74) *Attorney, Agent, or Firm* — Dinsmore & Shohl LLP

(57) ABSTRACT

The present disclosure provides a steam-type air fryer, which has a steam system, a steam conveying structure, a water tank structure, a steam-generator heat dissipation structure, and a steam-generator cleaning structure, and relates to the technical field of steam-type air fryers.

17 Claims, 14 Drawing Sheets

(56) References Cited

OTHER PUBLICATIONS

Machine translation of FR 2640358 A1 performed on Mar. 15, 2023, Beaudry (Year: 1990).*
Machine translation of WO 2016129968 A1 performed on Mar. 15, 2023, Kim (Year: 2016).*
Machine translation of CN 111214131 A performed on Mar. 15, 2023, Li et al. (Year: 2020).*
Machine translation of CN 102356998 A performed on Mar. 15, 2023, Lin (Year: 2012).*
Machine translation of CN 110141902 A performed on Mar. 15, 2023, Xu et al. (Year: 2019).*
Machine translation of RU 2672831 C2 performed on Mar. 15, 2023, Tomas et al. (Year: 2018).*
Machine translation of CN 206338780 U performed on Sep. 29, 2023, Guo et al. (Year: 2017).*
European Office Action for Application No. 21 196 041.4 dated Apr. 8, 2022.

* cited by examiner

STEAM-TYPE AIR FRYER

CROSS-REFERENCE TO RELATED APPLICATIONS

The present disclosure claims the priority to the Chinese patent application with the filing number CN202022398485.8, filed on Oct. 26, 2020 with the Chinese Patent Office, and entitled "Steam System of Steam-type Air Fryer", the Chinese patent application with the filing number CN202120315121.0, filed on Feb. 4, 2021 with the Chinese Patent Office, and entitled "Steam Conveying Structure of Steam-type Air Fryer", the Chinese patent application with the filing number CN202120892074.6, filed on Apr. 28, 2021 with the Chinese Patent Office, and entitled "Water Tank Structure of Steam-type Air Fryer", the Chinese patent application with the filing number CN202120892092.4, filed on Apr. 28, 2021 with the Chinese Patent Office, and entitled "Steam-generator Heat Dissipation Structure of Steam-type Air Fryer", and the Chinese patent application with the filing number CN202120893925.9, filed on Apr. 28, 2021 with the Chinese Patent Office, and entitled "Steam-generator Cleaning Structure of Steam-type Air Fryer", the contents of which are incorporated herein by reference in entirety.

TECHNICAL FIELD

The present disclosure relates to the technical field of steam-type air fryers, in particular, to a steam system, a steam conveying structure, a water tank structure, a steam-generator heat dissipation structure, and a steam-generator cleaning structure of a steam-type air fryer.

BACKGROUND ART

Air fryers are kitchen appliances that are now favorite. Most air fryers now available in the market have only an air frying function, and the form of cooking food is relatively single, which cannot satisfy the diversified demands of users. People who want to steam and stew food cannot use the air fryer to steam and stew food. Therefore, in order to enrich the cooking modes, an air fryer with a steam cooking function is provided, that is, a steam generator is additionally provided on the basis of the conventional air fryer, so that high-temperature steam can be generated and introduced into a cooking cavity, to steam and stew food.

However, this novel steam-type air fryer has the following problems and defects: the steam of these air fryers usually cannot be directly sprayed into the cooking cavity of the air fryer to directly act on food, so the steaming and stewing effect is unfavorable; and when the air fryer with the steam function is being used, the high-temperature steam needs to be generated by the steam generator and introduced into the cooking cavity, but water vapor will also contain some water which is not evaporated and will enter the cooking cavity with the water vapor, thus the water consumption is faster, and more water will be left in the cooking cavity, which will also affect the cooking efficiency; as the steam generator is a high-heating electric device, when such product is being used, the steam generator will generate heat and preferably needs heat dissipation, while the steam generator on existing products cannot perform good heat dissipation; the steam generator generates steam by heating water, thus scale will be formed on an inner wall of the steam generator after the steam generator operates for a period of time, so that the efficiency of the steam generator is lower, therefore, a structure is required to be designed that can clean the steam generator in time; as the steam generator needs continuous supply of water to generate steam, the air fryer is usually provided with a water tank which generally is a sealed structure, and when water in the water tank is slowly reduced, a negative pressure will be formed in the water tank, in this case, an adverse effect will be produced on the discharge of water, and the practicality of the product is poor.

SUMMARY

In order to solve various technical problems and defects in the above, the present disclosure provides a steam-type air fryer, which has a steam system, a steam conveying structure, a water tank structure, a steam-generator heat dissipation structure, and a steam-generator cleaning structure.

Technical solutions of the present disclose are as follows.

The present disclosure provides a steam system of a steam-type air fryer, having both an air frying function and a steam cooking function, and having good steaming and stewing effect.

In order to achieve the above objective, the present disclosure provides a following technical solution: a steam system of a steam-type air fryer, including a cooking cavity provided in the air fryer, a frying pot is provided in the cooking cavity, the air fryer is further provided with a steam generator and a water tank for supplying water to the steam generator, a steam nozzle in communication with the steam generator is installed at a side of the cooking cavity, the steam nozzle passes through the cooking cavity and extends into the frying pot, a frying board is set up in the frying pot, and a steam spraying port of the steam nozzle is located below the frying board.

In one or more embodiments, a sealing sleeve is provided on an inner wall of the frying pot, and the steam nozzle passes through the sealing sleeve.

In one or more embodiments, the sealing sleeve is fixed on a side wall of the frying pot by a fixing pressure plate outside. Preferably, the side wall of the frying pot is provided with a step, the step is flush with the fixing pressure plate, and the step and the fixing pressure plate jointly support the frying board.

In one or more embodiments, a guide conical surface is provided on a part of the steam nozzle matched with the sealing sleeve, and a conical hole matched with the guide conical surface is provided at an end of the sealing sleeve facing the side wall of the frying pot.

In one or more embodiments, a slope of conical surface of the conical hole is greater than that of conical surface of the guide conical surface.

In one or more embodiments, a flap is provided on an inner side wall of an inner bore of the sealing sleeve for the steam nozzle to pass through, and the flap is pushed open by the steam nozzle or is folded to seal the inner bore.

In one or more embodiments, an embedding groove is provided at an end of the sealing sleeve away from the side wall of the frying pot, and a crimped portion embedded into the embedding groove is provided at an end of the fixing pressure plate.

In one or more embodiments, a sealing ring is installed between the outside of the cooking cavity and the steam nozzle.

In one or more embodiments, the water tank is provided at the top of the air fryer, the steam generator is provided below the cooking cavity, and the water tank is connected to the steam generator through a water pump and a water pipe.

In one or more embodiments, the steam generator is in communication with the steam nozzle through a steam pipeline and matched steam adapters Compared with the prior art, the steam system of a steam-type air fryer provided in the present disclosure can realize the following beneficial technical effects: the steam nozzle is provided at the side of the cooking cavity, and the high-temperature steam is directly sprayed near the food, then the cooking effect is better; the steam nozzle is provided below the frying board, and the high-temperature steam is sprayed to the lower part of the food, to render a better steaming and stewing effect of the food; furthermore, the reliable fixing and sealing structure is provided between the steam nozzle and the cooking cavity and the frying pot, ensuring that no steam leakage occurs.

The present disclosure further provides a steam conveying structure of a steam-type air fryer, wherein with the steam conveying structure, the water vapor in the steam may be separated, ensuring that the steam finally entering the cooking cavity of the air fryer has a high temperature and a low water content, thus, the cooking efficiency and quality are improved.

In order to achieve the above objective, the present disclosure provides a following technical solution: a steam conveying structure of a steam-type air fryer, wherein the steam-type air fryer includes a cooking cavity and a steam generator, the cooking cavity and the steam generator are in communication through the steam conveying structure, and the steam conveying structure includes:

a first steam conveying pipe, which has one end being in communication with the steam generator;

a second steam conveying pipe, which is in communication with the other end of the first steam conveying pipe, wherein an included angle is formed between the second steam conveying pipe and the first steam conveying pipe, so that the steam collides when entering the second steam conveying pipe from the first steam conveying pipe; and a steam nozzle, which has one end being in communication with the cooking cavity, and the other end being in communication with the second steam conveying pipe.

The existence of the included angle enables the steam to collide with the side wall when entering the second steam conveying pipe, and during the collision, moisture in the steam will be separated from the steam, and the moisture will fall down and flow along the first steam conveying pipe back into the steam generator, and continue to generate high-temperature steam.

In one or more embodiments, the first steam conveying pipe is vertically arranged, with a lower end thereof being in communication with a top steam outlet of the steam generator, the second steam conveying pipe is transversely arranged, and the second steam conveying pipe is arranged to be inclined at a certain angle towards one side of the first steam conveying pipe. The first steam conveying pipe is vertically arranged and the second steam conveying pipe is obliquely arranged towards the first steam conveying pipe so that the separated moisture may be quickly returned into the steam generator.

In one or more embodiments, the second steam conveying pipe is in communication with the steam nozzle through the third steam conveying pipe. Through the third steam conveying pipe, the steam in the second steam conveying pipe may be guided to any position on the side wall of the cooking cavity.

In one or more embodiments, the steam nozzle is provided at the bottom or a lower part of the cooking cavity, and a position of the steam nozzle may be closer to the food in the cooking cavity, then the cooking effect is better.

In one or more embodiments, the first steam conveying pipe and the third steam conveying pipe are connected to the second steam conveying pipe through adapters, the adapters may realize sequential connection of the first steam conveying pipe and the third steam conveying pipe to the second steam conveying pipe. Fabrication of each steam conveying pipe is relatively simple and flexible.

In one or more embodiments, the first steam conveying pipe, the third steam conveying pipe, and the second steam conveying pipe constitute an integral steam conveying pipeline, and the integral steam conveying pipeline is composed of several parts inserted and spliced into each other, facilitating the assembling of the integral steam conveying pipeline.

In one or more embodiments, the first steam conveying pipe, the third steam conveying pipe, and the second steam conveying pipe constitute an integral steam conveying pipeline, the integral steam conveying pipeline is divided into several parts, and various parts are connected through double-end connection pipes. The connection through the double-end connection pipes may reduce the manufacturing and production difficulty of the integral steam conveying pipeline.

In one or more embodiments, the first steam conveying pipe, the third steam conveying pipe, and the second steam conveying pipe constitute an integral steam conveying pipeline that is integrally molded. The installation is convenient and fast, and the sealability is good.

In one or more embodiments, a water tank is provided at the top of the cooking cavity, the steam generator is in communication with the water tank through a water pipe and a water pump. Providing the water tank on top facilitates adding water and cleaning, and the water pump may adjust and control a water supply amount to the steam generator.

In one or more embodiments, the steam generator is provided at the bottom of the cooking cavity, then an inner space of the air fryer may be fully utilized, moreover, the steam generator is closer to the cooking cavity, then it is also convenient to install the steam conveying structure.

Compared with the prior art, the steam conveying structure of a steam-type air fryer provided in the present disclosure can realize the following beneficial technical effects: the steam conveying structure is designed with a bending included angle, and the steam may collide in the conveying process by utilizing the principle of the bending included angle, to separate the water vapor in the steam, and the separated water vapor may be returned into the steam generator to continue to generate steam, ensuring that the steam finally entering the cooking cavity of the air fryer has a high temperature and a low water content, thus, the cooking efficiency and quality are improved.

The present disclosure further provides a steam-generator heat dissipation structure of a steam-type air fryer, wherein a steam generator may dissipate heat through a heat dissipation hole at the bottom, so as to ensure that the steam generator may maintain normal operation in a long term.

In order to achieve the above objective, the present disclosure provides a following technical solution: a steam-generator heat dissipation structure of a steam-type air fryer, wherein the air fryer is provided therein with a cooking cavity, the cooking cavity is formed by an upper core and a lower core, and a steam generator is further included, which is configured to generate high-temperature steam and introduce the high-temperature steam into the cooking cavity, wherein the steam generator is installed between the lower core and a base of the air fryer, and the base is provided thereon with a first heat dissipation hole corresponding to the steam generator.

In one or more embodiments, the steam generator is provided at the bottom of the lower core of the air fryer.

In one or more embodiments, a protective box is provided outside the steam generator, and the steam generator is positioned and installed at the bottom of the lower core through the protective box. The protective box is provided with a second heat dissipation hole corresponding to a heat generating component of the steam generator.

In one or more embodiments, the second heat dissipation hole is arranged corresponding to the first heat dissipation hole.

In one or more embodiments, a heat dissipation channel in communication with the outside is formed between the cooking cavity and a housing of the air fryer, a heat dissipation fan configured to generate a heat dissipation airflow is provided in the heat dissipation channel, between the lower core and the base is a heat dissipation cavity, the heat dissipation cavity is a part of the heat dissipation channel, and the heat dissipation airflow flows in the heat dissipation channel.

In one or more embodiments, the first heat dissipation holes are a plurality of arc-shaped heat dissipation holes arranged in an annular shape.

In one or more embodiments, the protective box is provided with a sinking step portion, and the second heat dissipation hole is provided in the sinking step portion.

In one or more embodiments, the second heat dissipation holes are a plurality of round holes arranged in a form of rectangular array.

In one or more embodiments, several third heat dissipation holes are provided in a side portion of the base, and the heat dissipation airflow in the heat dissipation cavity passes through the third heat dissipation holes.

In one or more embodiments, a bottom surface of the base is provided with several supporting legs.

Compared with the prior art, the steam-generator heat dissipation structure of a steam-type air fryer provided in the present disclosure can realize the following beneficial technical effects: the steam generator is provided at the bottom of the lower core, and located between the lower core and the base, and the heat dissipation hole corresponding to the steam generator is provided in the base, so as to facilitate the heat dissipation of the steam generator; the protective box is provided outside the steam generator, and may realize positioning and installation of the steam generator, and ensure the reliability of the installation thereof; meanwhile, the corresponding heat dissipation hole is provided in the protective box, and the protective box does not affect the heat dissipation; moreover, between the lower core and the base is the heat dissipation cavity, in which there is the heat dissipation airflow, and the heat dissipation airflow flows out from the heat dissipation hole after flowing through the steam generator, and may take away heat generated by the steam generator during operation, realizing better heat dissipation for the steam generator.

The present disclosure further provides a steam-generator cleaning structure of a steam-type air fryer, which may realize cleaning of the steam generator in time.

In order to achieve the above objective, the present disclosure provides a following technical solution: a steam-generator cleaning structure of a steam-type air fryer, wherein a cooking cavity is provided inside the air fryer, a steam generator is provided outside the cooking cavity, the steam generator introduces high-temperature steam into the cooking cavity, a drain hole in communication with the outside is provided in the steam generator, and a port of the drain hole is blocked by a pluggable-type water outlet plug.

In one or more embodiments, the water outlet plug includes an installation portion and a blocking portion, the installation portion is fixed outside the steam generator, and the blocking portion blocks the port of the drain hole.

In one or more embodiments, a protective box is connected to the outside of the steam generator, an extension pipe extending to an outer side wall of the protective box is installed at the drain hole, the water outlet plug includes an installation portion and a blocking portion, the blocking portion blocks a port of the extension pipe, and the installation portion is connected to the protective box.

In one or more embodiments, an outer end portion of the blocking portion is provided with a raised rib as an operation portion.

In one or more embodiments, a body shell of the air fryer is provided with an opening in a position corresponding to the water outlet plug, and a detachable water plug cover is installed at the opening.

In one or more embodiments, a side edge of the water plug cover is provided with a clamping plate, the clamping plate is clamped with a clamping groove on a side wall of the opening on the body shell, and the other side of the water plug cover is connected to the body shell via a fastener.

In one or more embodiments, a compression rib for compressing the blocking portion of the water outlet plug is provided at an inner side of the water plug cover.

In one or more embodiments, the steam generator is installed at the bottom of the air fryer, and the drain hole is provided at the bottom of the steam generator.

In one or more embodiments, the steam generator is installed at the bottom of the air fryer, the drain hole is provided at the bottom of the steam generator, and the water plug cover is installed on the base of the body shell.

In one or more embodiments, heat dissipation holes are provided in an annular shape around the water plug cover.

Compared with the prior art, the steam-generator cleaning structure of a steam-type air fryer provided in the present disclosure can realize the following beneficial technical effects: the steam generator is provided with the drain hole, and the pluggable-type water outlet plug is provided at the drain hole. When the steam generator needs to be cleaned, the washing liquid may be introduced into the steam generator, and the water outlet plug is removed to discharge sewage through the drain hole, so as to realize the cleaning of the steam generator; the water outlet plug includes the installation portion, the blocking portion, and the operation portion, which may realize installation of the water outlet plug, meanwhile, the drain hole may be manually blocked or opened; at the same time, the water outlet plug is made of a heat-resistant elastic rubber material, so as to facilitate the installation thereof, meanwhile, the sealing effect is better; a corresponding water plug cover is provided outside the water outlet plug, and may shield and protect the water outlet plug; the water outlet plug is fixed on the base through clamping in cooperation with a screw, and the fixing is reliable and the disassembly and assembly are convenient; the compression rib on the water outlet plug may compress the blocking portion of the water outlet plug, and ensure that it will not fall off; moreover, the steam generator is disposed at the bottom of the air fryer, and the drain hole is provided at the bottom of the steam generator, thus facilitating the operation of cleaning and discharging the sewage.

The present disclosure further provides a water tank structure of a steam-type air fryer, which may realize that the air pressure in the water tank is kept at unchanged atmospheric pressure, thereby ensuring that the water in the water tank can be smoothly discharged regardless of the amount of water, thus ensuring the practicality of the product.

In order to achieve the above objective, the present disclosure provides a following technical solution: a water tank structure of a steam-type air fryer, including a water tank body, installed at an upper side of an air fryer body, wherein a top portion of the water tank body is provided with an upper cover and a water storage cavity is formed inside the water tank body, and the upper cover of the water tank body is provided with an air intake in communication with the water storage cavity, so that inside and outside of the water tank body are in communication to each other.

In one or more embodiments, the upper cover is detachably connected to or integrally molded with the water tank body.

In one or more embodiments, a shielding structure for covering the air intake is provided at an upper side of the upper cover.

In one or more embodiments, the upper cover is provided with a water tank cover, the water tank cover is provided with a water adding port, the water tank cover is provided with a shielding cover, and the shielding cover shields the water adding port.

In one or more embodiments, the water tank cover is inwardly recessed to form a concave cavity, and the water adding port is provided at the bottom of the concave cavity.

In one or more embodiments, a peripheral edge of the shielding cover extends to close to an edge position of the concave cavity.

In one or more embodiments, the air intake is provided in the concave cavity of the water tank cover, and covered by the shielding cover.

In one or more embodiments, a bottom of a side wall of the shielding cover abuts against a bottom of the concave cavity, and the side wall of the shielding cover is provided with a penetrating ventilation groove or ventilation hole.

In one or more embodiments, the air intake is provided on a boss structure, and the boss structure is higher than the bottom of the concave cavity.

In one or more embodiments, the water adding port and the air intake are a same hole.

Compared with the prior art, the water tank structure of a steam-type air fryer provided in the present disclosure can realize the following beneficial technical effects: the air intake in communication with the internal water storage cavity is provided above the water tank, which may realize that the air pressure in the water tank is kept at unchanged atmospheric pressure, thereby ensuring that the water in the water tank can be smoothly discharged regardless of the amount of water, thus ensuring the practicality of the product; the air intake is provided with the shielding structure, to avoid the debris from entering the water tank through the air intake, and meanwhile also make the appearance unobtrusive; and the upper cover of the water tank is provided with the water tank cover, the air intake is also provided in the water tank cover, and the water tank cover is further provided with the water adding port, so that water can be added to the water tank. The water tank cover is detachably provided with the shielding cover, mainly used for shielding the water adding port and the air intake after the water adding is completed, so as to avoid debris from entering the water tank; the water tank cover is in an inwardly recessed structure, and a water inlet is provided at the bottom of the concave cavity, so as to facilitate in adding water; moreover, the air intake and the water adding port are both provided on the boss structure, ensuring that an entrance of the air intake is higher than the bottom of the concave cavity, so that it is not easily blocked by water and other debris to affect the ventilation effect.

DETAILED DESCRIPTION OF EMBODIMENTS

Figure 1:
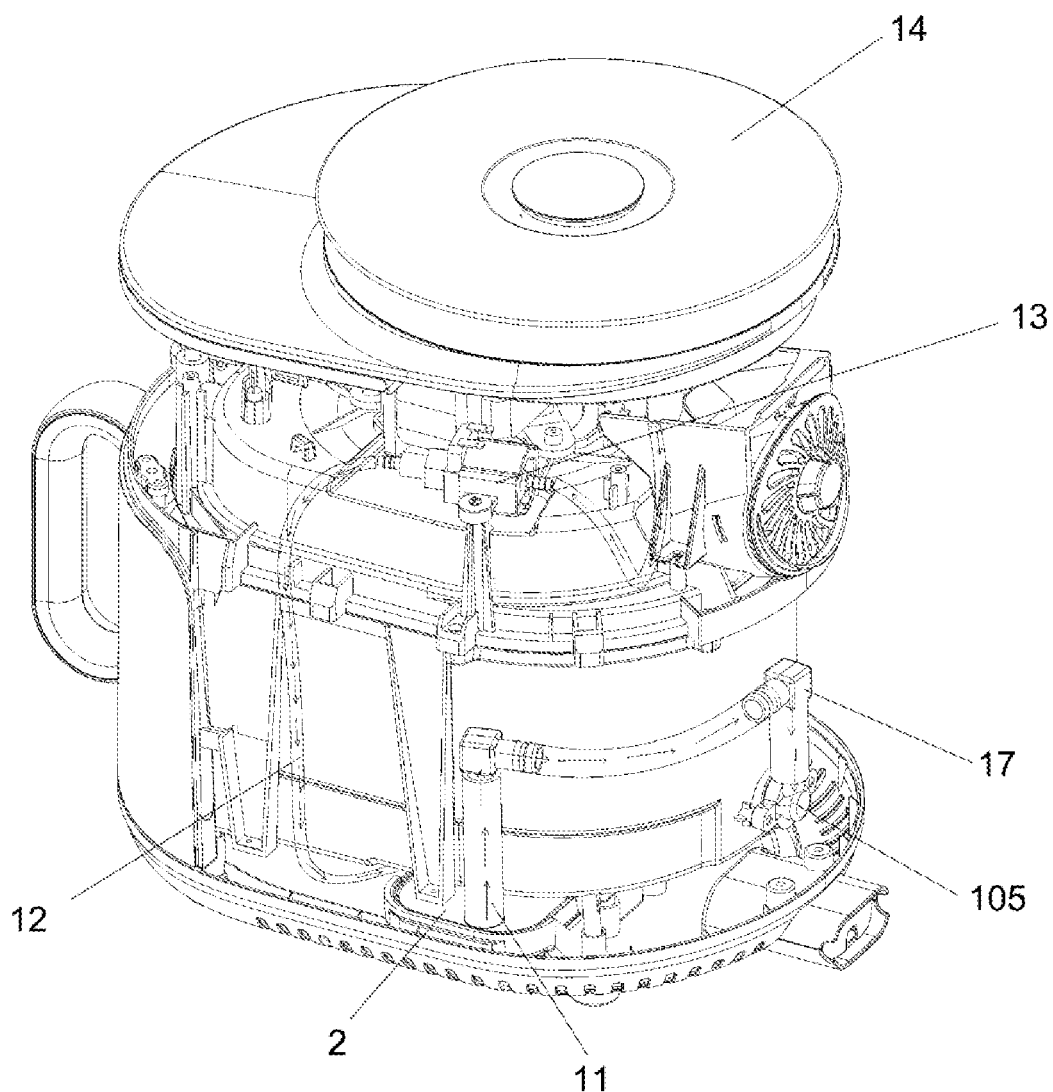
FIG. 1 is an internal perspective structural view of a steam-type air fryer provided in the present disclosure.

In order to make objectives, technical solutions, and advantages of the embodiments of the present disclosure clearer, the technical solutions in the embodiments of the present disclosure will be described clearly and completely below in conjunction with the accompanying drawings in the embodiments of the present disclosure, and apparently, some but not all embodiments of the present disclosure are described. Generally, components in the embodiments of the present disclosure described and shown in the accompanying drawings herein may be arranged and designed in various different configurations.

Therefore, the following detailed description of the embodiments of the present disclosure provided in the accompanying drawings is not intended to limit the scope of protection of the present disclosure, but merely represents chosen embodiments of the present disclosure. Based on the embodiments in the present disclosure, all of other embodiments obtained by those ordinarily skilled in the art without using creative efforts shall fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be noted that orientation or positional relationships indicated by terms such as "upper", "lower", "inner", and "outer", if appear, are based on orientation or positional relationships as shown in the accompanying drawings, or orientation or positional relationships of a product in the present disclosure when being conventionally placed in use, merely for facilitating describing the present disclosure and simplifying the description, rather than indicating or suggesting that related apparatuses or elements have to be in the specific orientation or configured and operated in a specific orientation, therefore, they should not be construed as limitation on the present disclosure. Besides, terms such as "first" and "second", if appear, are merely for distinguishing description, but should not be construed as indicating or implying importance in the relativity.

Moreover, the terms "horizontal", "vertical", "overhanging", and the like do not mean that the parts are required to be absolutely horizontal or overhanging, but may be slightly inclined. For example, by "horizontal" it merely means that a structure is more horizontal in comparison with "vertical", rather than being completely horizontal, while the structure can be slightly inclined.

In the description of the present disclosure, it should be further illustrated that, unless otherwise specifically regulated and defined, the terms "provide", "install", "link", and "connect" should be understood in a broad sense, for example, a connection may be a fixed connection, a detachable connection, or an integrated connection; it may be a mechanical connection or an electrical connection; it may be direct linking or indirect linking through an intermediate medium, and it also may be inner communication between two elements. For a person ordinarily skilled in the art, specific meanings of the above-mentioned terms in the present disclosure could be understood according to specific circumstances.

It should be indicated that the features in the embodiments of the present disclosure may be combined with each other without conflict.

Figure 2:
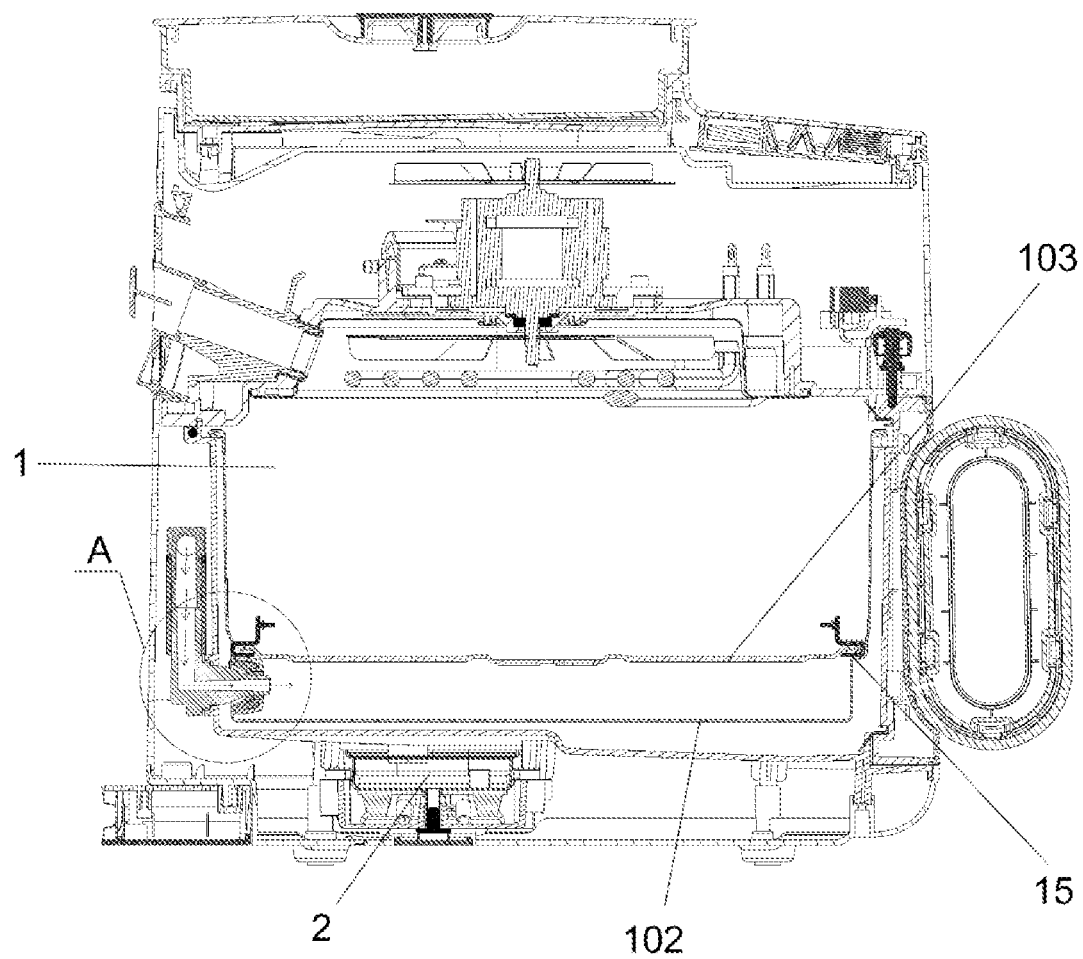
FIG. 2 is a front semi-sectional structural view of the steam-type air fryer provided in the present disclosure.
Figure 3:
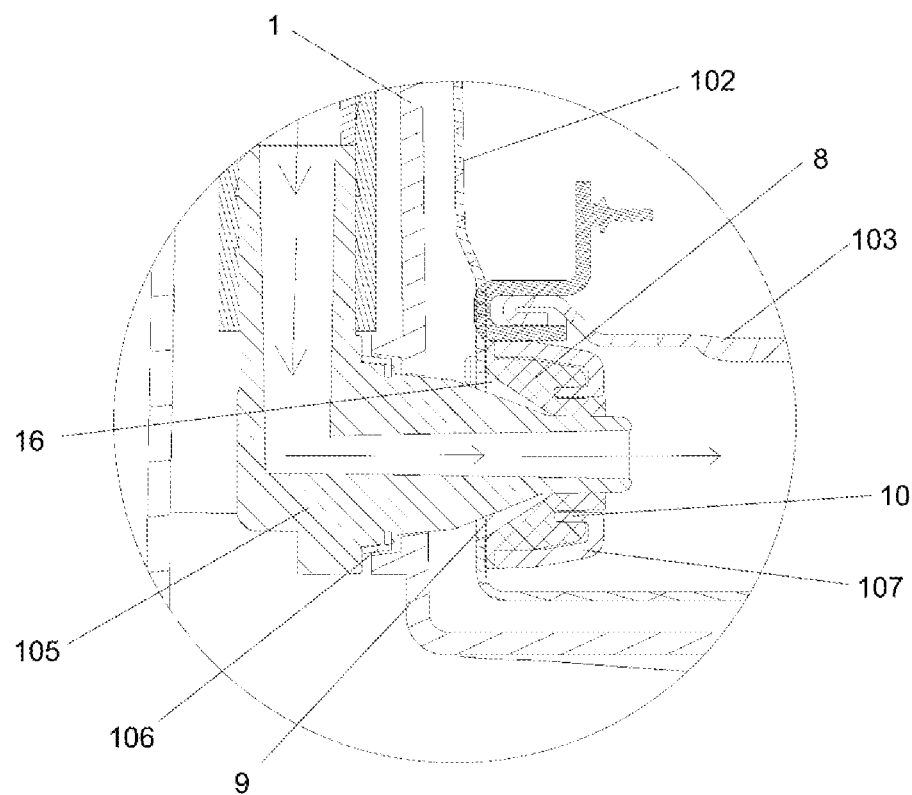
FIG. 3 is an enlarged structural view of a part A in FIG. 2.

As shown in FIGS. 1-3, the present disclosure provides a steam system of a steam-type air fryer, including a cooking cavity 1 provided in the air fryer, a frying pot 102 is provided inside the cooking cavity 1, the air fryer is further installed with a steam generator 2 and a water tank 14 for supplying water to the steam generator 2, a steam nozzle 105 in communication with the steam generator 2 is installed at a side of the cooking cavity 1, the steam nozzle 105 passes through the cooking cavity 1 and extends into the frying pot 102, a frying board 103 is erected in the frying pot 102, and a steam spraying port of the steam nozzle 105 is located below the frying board 103.

When cooking, the steam generator 2 heats water conveyed from the water tank 14 to form hot steam and directly inputs the hot steam into the cooking cavity 1 through the steam nozzle 105, and as the steam nozzle 105 is located below the frying board 103, and food is placed on the frying board 103, the entering hot steam will directly act on the food to steam and stew the food, without causing waste of the steam.

In order to improve the sealability, a sealing sleeve 8 is provided on an inner wall of the frying pot 102, and the steam nozzle 105 passes through the sealing sleeve 8. The sealing sleeve 8 functions to isolate the hot steam sprayed by the steam nozzle 105 from an opening on the frying pot 102 for the steam nozzle 105 to pass through, so that the hot steam sprayed by the steam nozzle 105 will not enter a gap between the cooking cavity 1 and the frying pot 102. The sealing sleeve 8 can be fixed in a variety of ways, such as clamping or fixing by a fastener, and in a solution of the present disclosure, the sealing sleeve 8 is fixed on the side wall of the frying pot 102 by a fixing pressure plate 107 outside the sealing sleeve.

Meanwhile, the side wall of the frying pot 102 is provided with a step 15, the step 15 is flush with the fixing pressure plate 107, and the step 15 and the fixing pressure plate 107 jointly support the frying board 103, in this way the fixing pressure plate 107 not only may fix the sealing sleeve 8 to ensure the sealability, but also may be used as a supporting point to support the frying board 103, so that there is no need to provide a circle of step 15 on the side wall of the frying pot 102.

Besides, in order to facilitate the steam nozzle 105 in passing through the sealing sleeve 8 during installation, a guide conical surface 9 is provided on a part of the steam nozzle 105 matched with the sealing sleeve 8, a conical hole 16 matched with the guide conical surface 9 is provided at an end of the sealing sleeve 8 facing the side wall of the frying pot 102, the guide conical surface 9 and the conical hole 16 are matched with each other to play a guiding role, so that the steam nozzle 105 can be rapidly inserted into the sealing sleeve 8, and a slope of conical surface of the conical hole 16 is greater than that of conical surface of the guide conical surface 9, in this way, the conical hole 16 can be fully compressed with the guide conical surface 9 when the sealing sleeve 8 is fixed, preventing the occurrence of problem of steam leakage.

Figure 4:
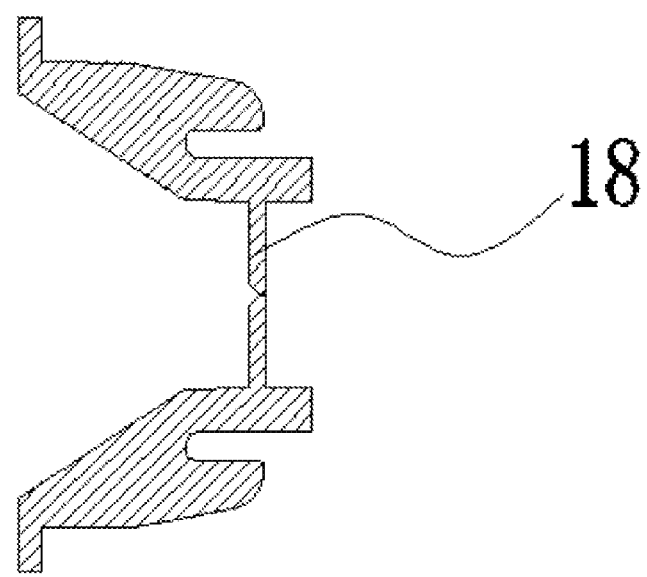
FIG. 4 is a semi-sectional structural view of a structure of a sealing sleeve of a steam-type air fryer provided in the present disclosure.

In some other embodiments, as shown in FIG. 4, a flap 18 is provided on an inner side wall of an inner bore of the sealing sleeve 8 for the steam nozzle 105 to pass through, and the flap 18 is pushed open by the steam nozzle 105 or is folded to seal the inner bore, so that when the steam nozzle 105 is inserted, the flap 18 may be pushed open without affecting the steam spraying of the nozzle; after the steam nozzle 105 is pulled out from the sealing sleeve 8, the flap 18 is folded under the elastic action to seal the inner bore, and prevent condensed water in the frying pot from flowing out from the inner bore of the sealing sleeve 8, so that the condensed water will not flow out from the sealing sleeve 8 when the food is steamed and the frying pot is taken out to pour out the food.

In a structural design of the sealing sleeve 8, an embedding groove is provided at an end of the sealing sleeve 8 away from the side wall of the frying pot 102, and a crimped portion 10 embedded into the embedding groove is provided at an end of the fixing pressure plate 107, so that the combination of the fixing pressure plate 107 and the sealing sleeve 8 is more tight and firm, and the two are not easy to fall off and be separated.

Meanwhile, in order to avoid leakage of hot steam in the cooking cavity 1 from an opening on the side wall of the cooking cavity 1 to the outside of the cooking cavity 1, a sealing ring 106 is installed between the outside of the cooking cavity 1 and the steam nozzle 105, ensuring that the hot steam circulates in the cooking cavity 1 all the time.

As an arrangement scheme of the steam system of the present disclosure, as shown in FIGS. 1-2, the water tank 14 is provided at the top of the air fryer, the steam generator 2 is provided below the cooking cavity 1, and the water tank 14 is connected to the steam generator 2 through a water pump 13 and a water pipe 12, and meanwhile, the steam generator 2 is in communication with the steam nozzle 105 through a steam pipeline 11 and matched steam adapters 17. The steam pipeline 11 includes usually straight pipes, and the straight pipes are connected by the steam adapters 17, so that the pipeline between the steam generator 2 and the steam nozzle 105 has relatively large variability, and may be flexibly arranged according to an internal structure of the air fryer.

Figure 5:
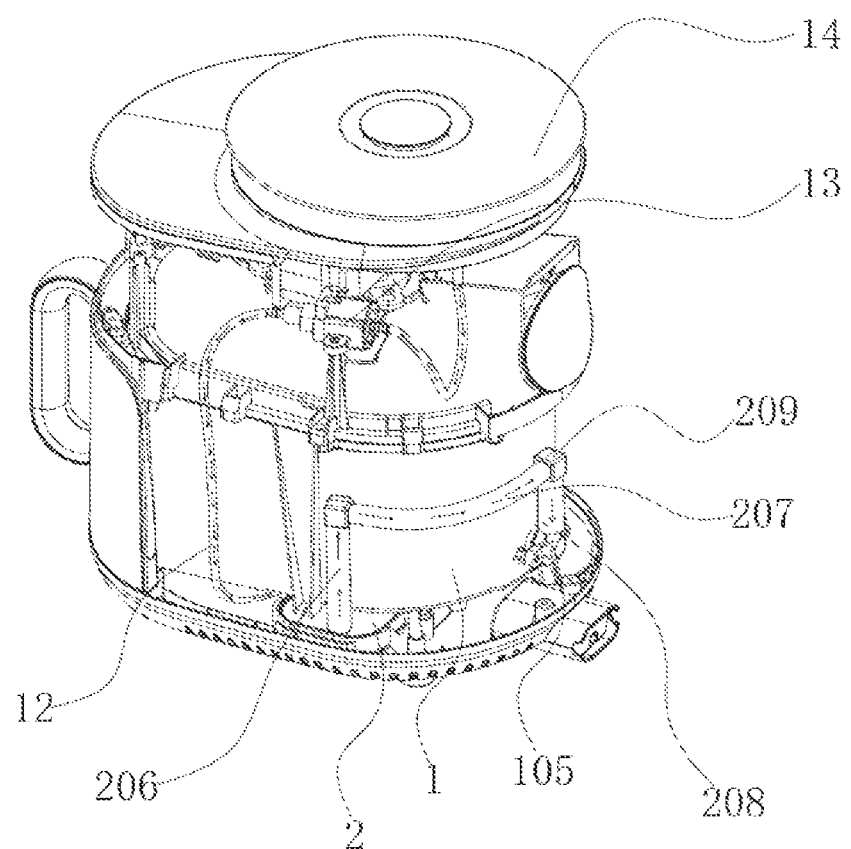
FIG. 5 is a perspective structural schematic view of a steam-type air fryer, in an installation and use state, provided in the present disclosure.
Figure 6:
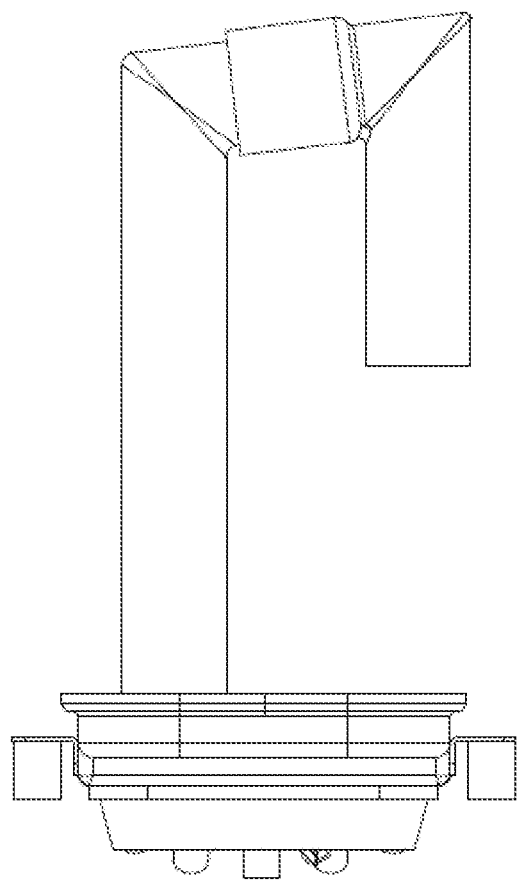
FIG. 6 is a front structural view of the steam-type air fryer provided in the present disclosure.
Figure 7:
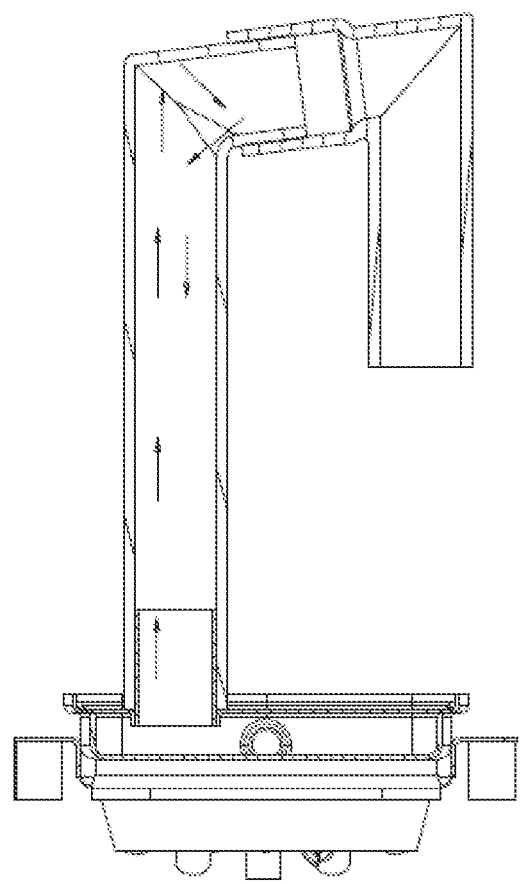
FIG. 7 is a front semi-sectional structural view of the steam-type air fryer provided in the present disclosure.

As shown in FIGS. 5-7, the present disclosure provides a steam conveying structure of a steam-type air fryer. The steam-type air fryer includes a cooking cavity 1 and a steam generator 2, the cooking cavity 1 and the steam generator 2 are in communication through the steam conveying structure, and the steam conveying structure includes a first steam conveying pipe 206, which has one end being in communication with the steam generator 2; and a second steam conveying pipe 207, which is in communication with the other end of the first steam conveying pipe 206, and an included angle is formed between the second steam conveying pipe 207 and the first steam conveying pipe 206. A steam nozzle 105 is further included, which has one end being in communication with the cooking cavity 1, and the other end being in communication with the second steam conveying pipe 207.

The existence of the included angle enables the steam to collide with the side wall when entering the second steam conveying pipe 207, and during the collision, moisture in the steam will be separated from the steam, and the moisture will fall down and flow along the first steam conveying pipe 206 back into the steam generator 2, and continue to generate high-temperature steam.

In the above, as shown in FIG. 6, the first steam conveying pipe 206 is vertically arranged, with a lower end thereof being in communication with a top steam outlet of the steam generator 2. The second steam conveying pipe 207 is transversely arranged, and the second steam conveying pipe 207 is arranged to be inclined at a certain angle towards one side of the first steam conveying pipe 206. The first steam conveying pipe 206 is vertically arranged and the second steam conveying pipe 207 is obliquely arranged towards the first steam conveying pipe 206 so that the separated moisture may be quickly returned into the steam generator 2. The steam collides with a side wall at a connection position of the second steam conveying pipe 207 and the first steam conveying pipe 206, so that the moisture in the steam may be separated from the steam, and the separated water will flow back into the steam generator 2 along the obliquely downward side wall of the second steam conveying pipe 207 and the first steam conveying pipe 206.

Meanwhile, the second steam conveying pipe 207 is in communication with the steam nozzle 105 through the third steam conveying pipe 208, the steam nozzle 105 is provided at the bottom or a lower part of the cooking cavity 1, the steam in the second steam conveying pipe 207 may be guided to a lower part of the cooking cavity 1 through the third steam conveying pipe 208, a position of the steam nozzle 105 may be closer to the food in the cooking cavity 1, then the cooking effect is better, therefore, the third steam conveying pipe 208 is generally arranged in a vertical state, the steam climbs in the second steam conveying pipe 207 and then directly goes down into the third steam conveying pipe 208, and the steam will not flow back.

In order to facilitate the connection between the steam conveying pipes, as shown in FIG. 5, the first steam conveying pipe 206 and the third steam conveying pipe 208 are connected to the second steam conveying pipe 207 through adapters 209, the adapters 209 may realize sequential connection of the first steam conveying pipe 206 and the third steam conveying pipe 208 to the second steam conveying pipe 207. Fabrication of each steam conveying pipe is relatively simple and flexible. A curved channel is provided inside the adapter 209, two ends of the adapter may be connected to the steam conveying pipes through ultrasonic welding, or a sealing element may be provided for sealing, ensuring that the steam will not leak outwards.

In another embodiment, the first steam conveying pipe 206, the third steam conveying pipe 208, and the second steam conveying pipe 207 constitute an integral steam conveying pipeline, and the integral steam conveying pipeline is composed of several parts inserted and spliced into each other, in this way, parts may be reduced. For the insertion into each other, an end with larger inner diameter is sleeved on an end with matched outer diameter, and after the sleeving, ultrasonic welding fixation may be carried out, or a sealant is filled in a position of insertion, to facilitate the assembling of the integral steam conveying pipeline.

In another embodiment, the first steam conveying pipe 206, the third steam conveying pipe 208, and the second steam conveying pipe 207 constitute an integral steam conveying pipeline, the integral steam conveying pipeline is divided into several parts, and various parts are connected through double-end connection pipes. The connection through the double-end connection pipes may reduce the manufacturing and production difficulty of the integral steam conveying pipeline, and likewise, a sealing measure may be adopted in a position where the double-end connection pipe and the steam conveying pipes are connected, improving the sealability.

In another embodiment, the first steam conveying pipe 206, the third steam conveying pipe 208, and the second steam conveying pipe 207 form an integral steam conveying pipeline that is integrally molded. An injection molding process may be adopted for integral molding. The installation is convenient and fast, and the overall sealability is good.

In addition, a water tank 14 is provided at the top of the cooking cavity 1, the steam generator 2 is in communication with the water tank 14 through a water pipe 12 and a water pump 13. Providing the water tank 14 on top facilitates adding water and cleaning, and the water pump 13 may adjust and control a water supply amount to the steam generator 2.

Meanwhile, the steam generator 2 is provided at the bottom of the cooking cavity 1, then an inner space of the air fryer may be fully utilized, and the steam generator is closer to the cooking cavity 1, then it is also convenient to install the steam conveying structure.

Figure 8:
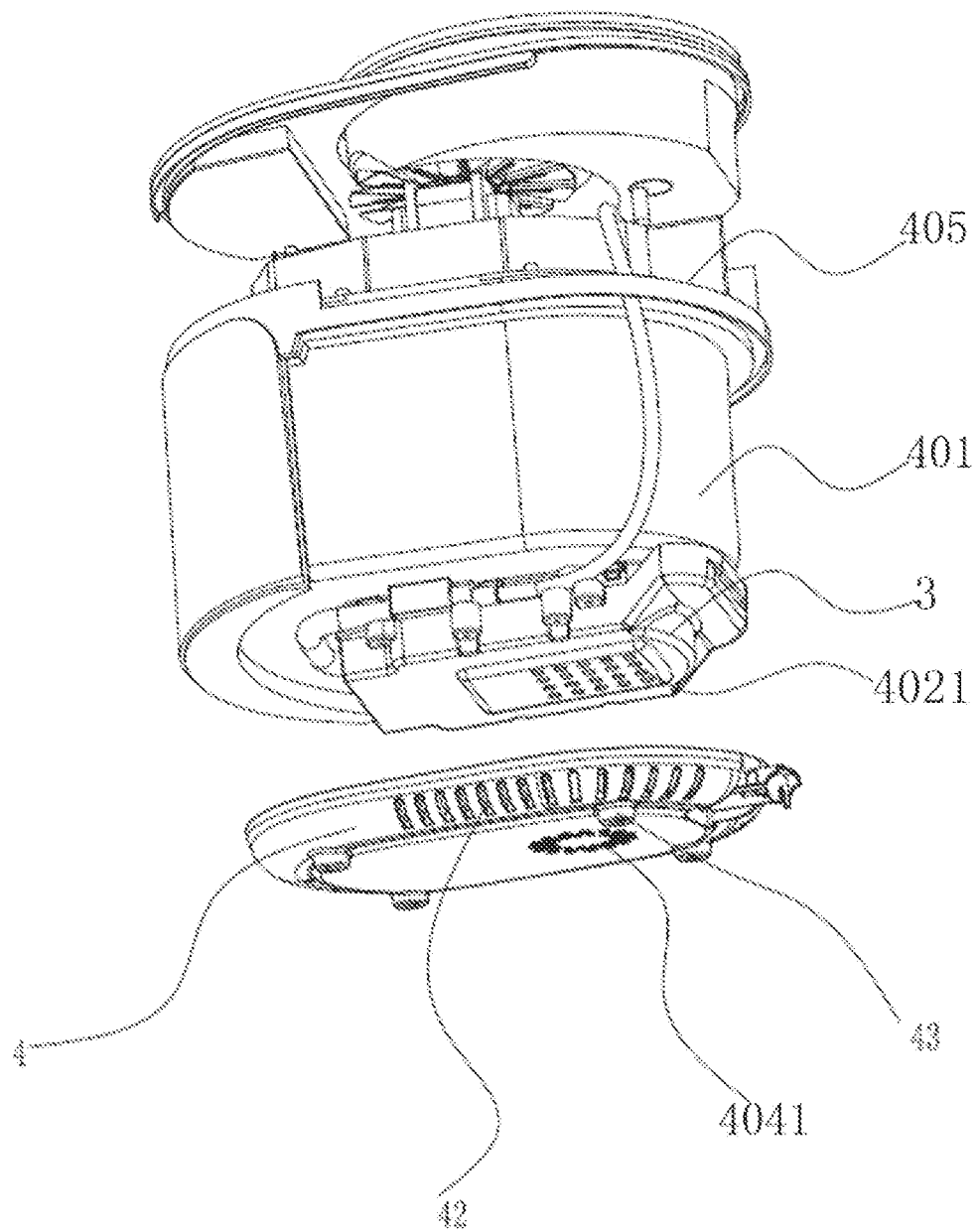
FIG. 8 is a perspective exploded structural schematic view of the steam-type air fryer provided in the present disclosure.
Figure 9:
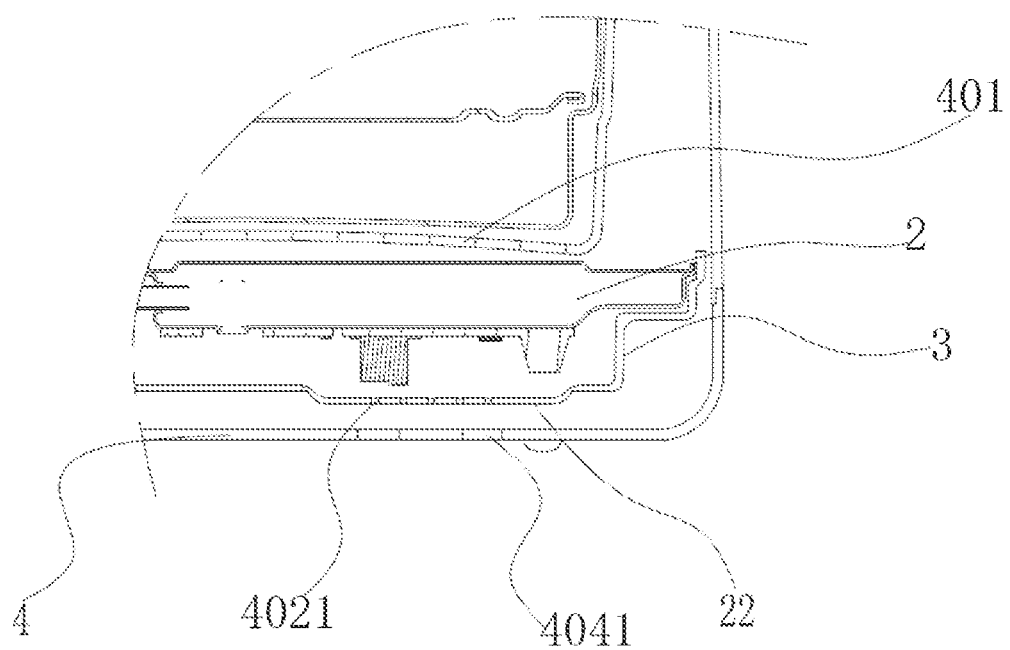
FIG. 9 is a partial sectional structural view of the steam-type air fryer provided in the present disclosure.
Figure 10:
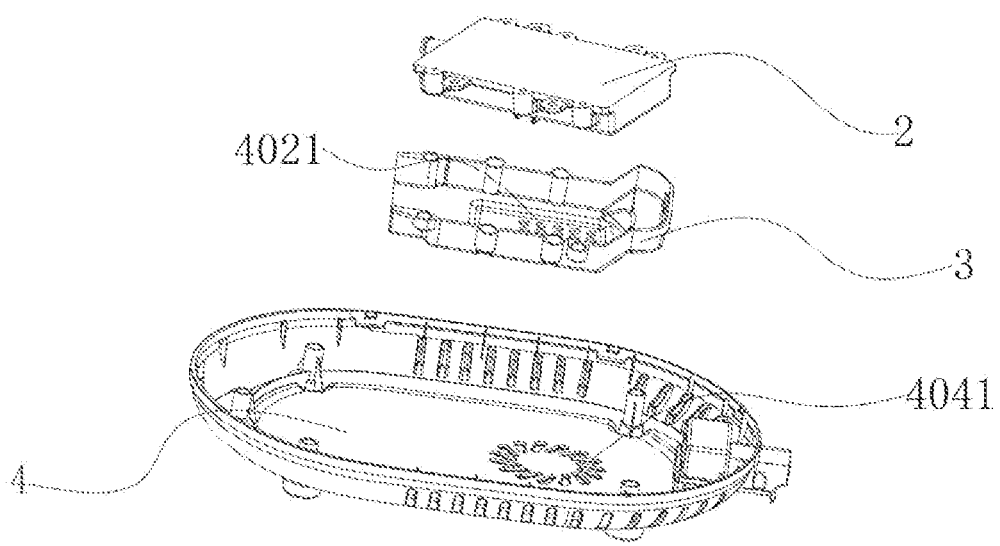
FIG. 10 is a partial perspective exploded structural schematic view of the steam-type air fryer provided in the present disclosure.
Figure 11:
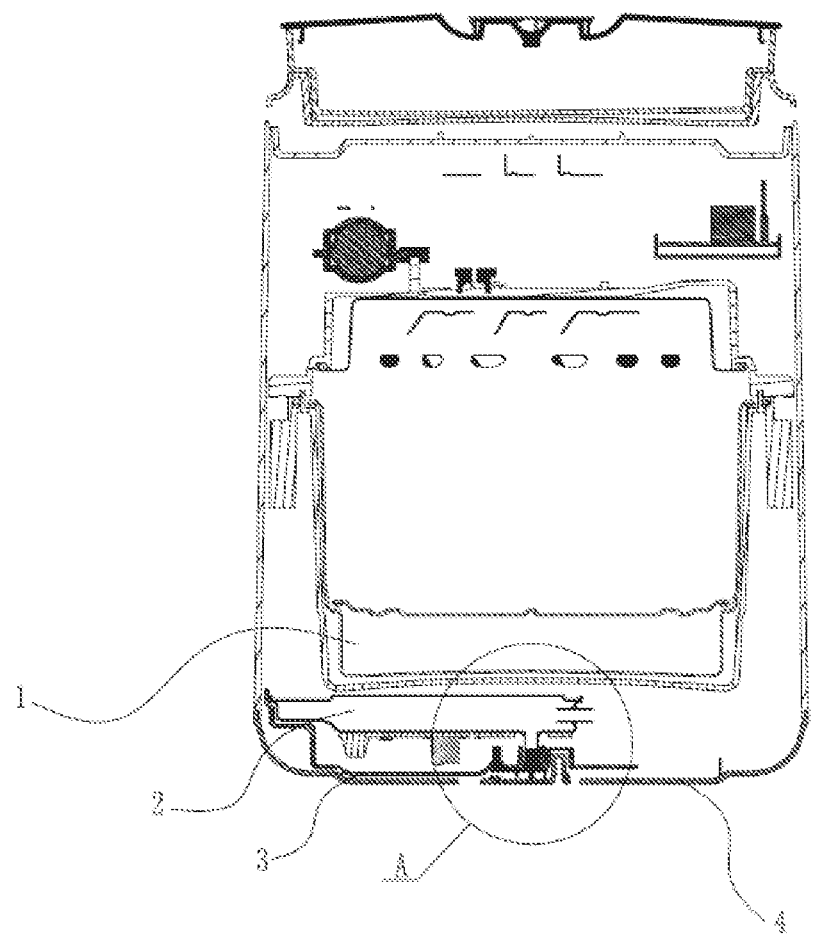
FIG. 11 is a front semi-sectional structural view of the steam-type air fryer provided in the present disclosure.
Figure 12:
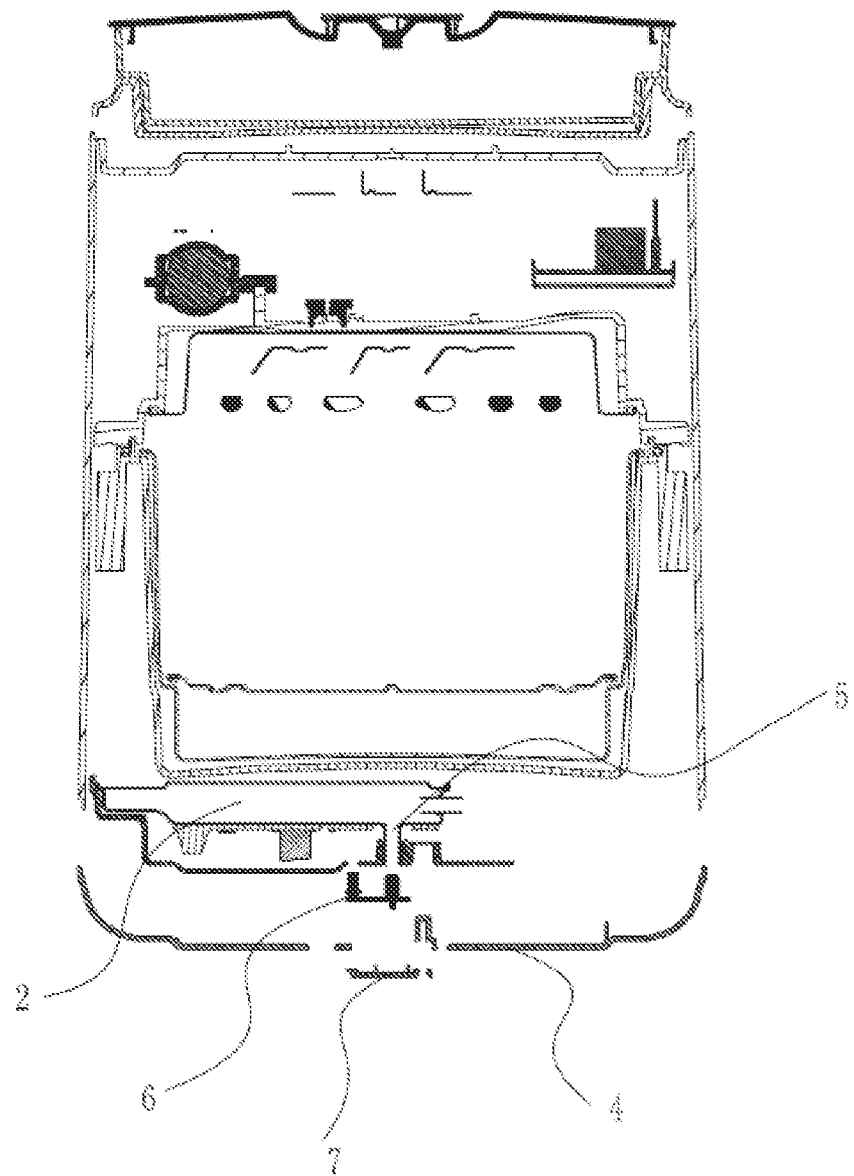
FIG. 12 is a front semi-sectional exploded structural view of the steam-type air fryer provided in the present disclosure.
Figure 13:
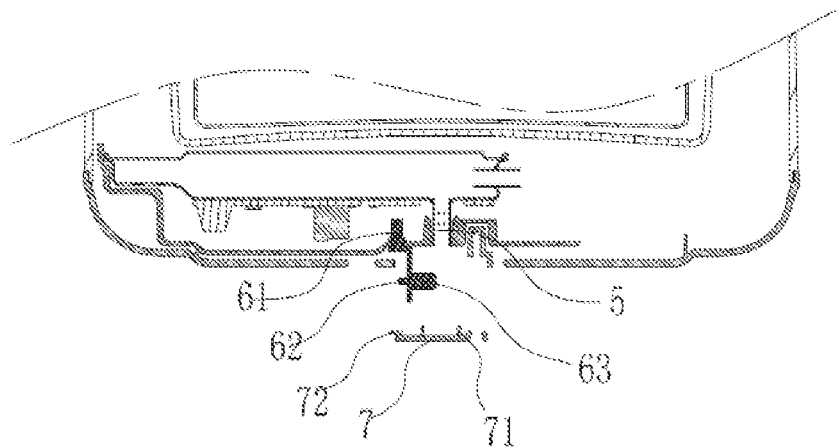
FIG. 13 is an enlarged structural view of a part A in FIG. 11.
Figure 14:
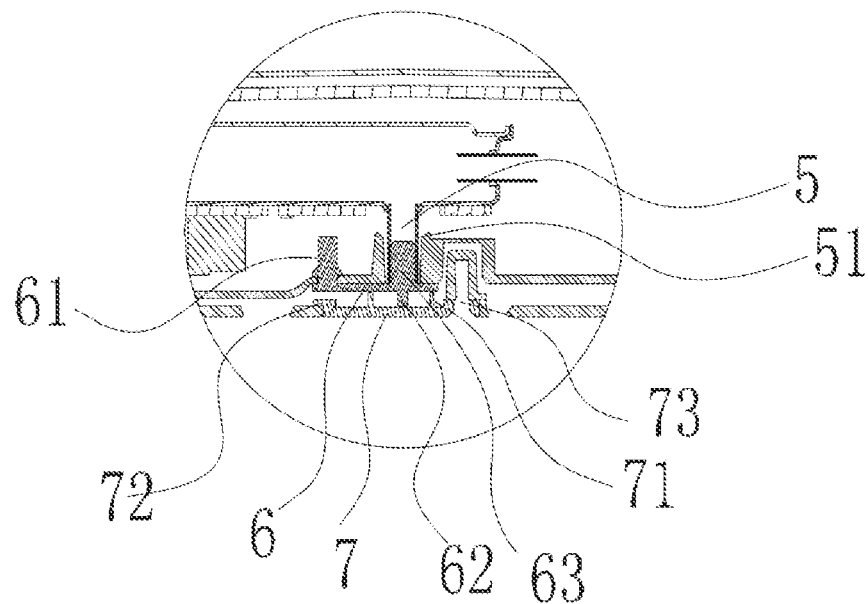
FIG. 14 is a partial semi-sectional exploded structural view of the steam-type air fryer provided in the present disclosure.
Figure 15:
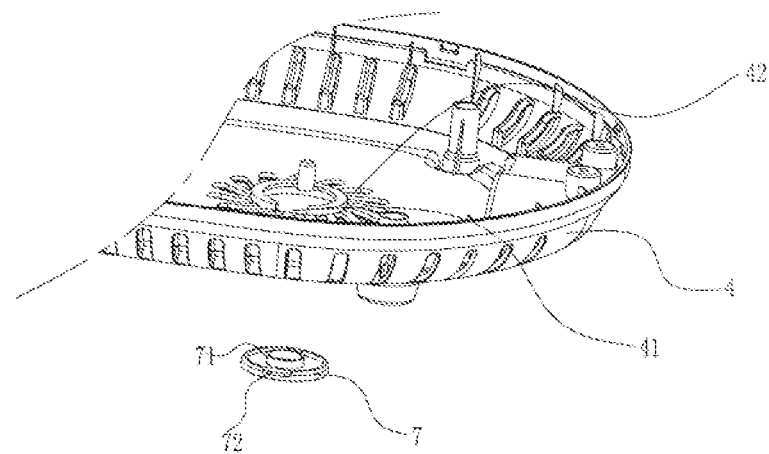
FIG. 15 is a perspective structural view of a base of the steam-type air fryer provided in the present disclosure.
Figure 16:
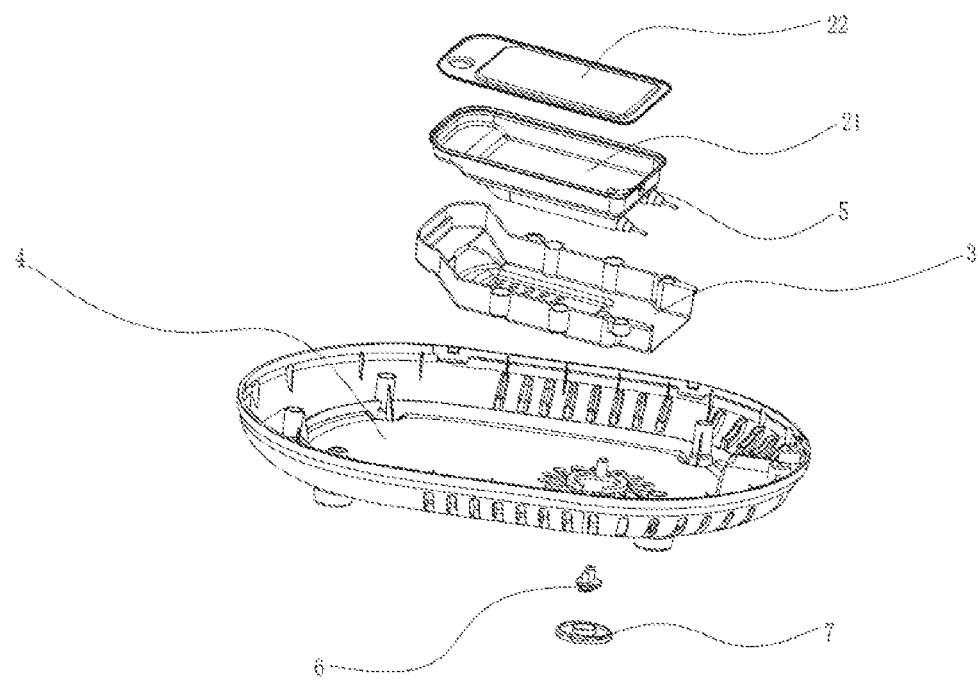
FIG. 16 is a partial perspective exploded structural view of the steam-type air fryer provided in the present disclosure.

As shown in FIGS. 8-10, the present disclosure provides a steam-generator heat dissipation structure of a steam-type air fryer, the air fryer is provided therein with a cooking cavity, the cooking cavity is formed by an upper core 405 and a lower core 401. A steam generator 2 is further included, configured to generate high-temperature steam and introduce the high-temperature steam into the cooking cavity. The steam generator 2 is installed between the lower core 401 and a base 4 of the air fryer. The base 4 is provided thereon with first heat dissipation holes 4041 corresponding to the steam generator 2, and through the first heat dissipation holes 4041, the heat emitted by the steam generator 2 may be dissipated, and outside temperature of the base 4 of the air fryer also may be lowered.

In the above, as shown in FIG. 8, the steam generator 2 is preferably provided at the bottom of the lower core 401 of the air fryer, in this way, the steam generator 2 is closer to the cooking cavity, then the steam generated by the steam generator 2 may be easily introduced into the cooking cavity.

In an embodiment, a protective box 3 is provided outside the steam generator 2, and the steam generator 2 is positioned and installed at the bottom of the lower core 401 through the protective box 3. The protective box 3 is provided with second heat dissipation holes 4021 corresponding to a heat generating component of the steam generator 2. The protective box 3 may prevent heat dissipated by the steam generator 2 from being directly diffused to the base 4 and a shell of the air fryer, and the heat will be preferentially diffused through the second heat dissipation holes 4021. The second heat dissipation hole 4021 is arranged corresponding to the first heat dissipation hole 4041. In this way, the heat coming out from the second heat dissipation hole 4021 may be directly discharged to the outside of the air fryer through the first heat dissipation hole 4041, therefore, the protective box 3 will not hinder the heat dissipation of the steam generator 2, and also has a heat insulation effect.

In another embodiment, the outside of the cooking cavity of the air fryer is a heat dissipation channel, a heat dissipation fan will be installed in the heat dissipation channel, which may absorb external cold air into the heat dissipation channel to form a heat dissipation airflow, to take away the heat generated by the cooking cavity and the control component. There is a heat dissipation cavity, which is also a component of the heat dissipation channel, between the lower core 401 and the base 4, therefore, the heat dissipation airflow circulates in the heat dissipation channel, the heat dissipation airflow may also take away the heat when flowing through the protective box 3 or the steam generator 2, and may also quickly take the heat out from the first heat dissipation hole 4041, then the heat dissipation effect is very good.

As shown in FIG. 8, in the above embodiment, a bottom surface of the base 4 may be provided with several supporting legs 43, so that there is a gap between the base 4 and a platform surface where the air fryer is placed, and heat of the steam generator 2 may be smoothly dissipated outwards through the first heat dissipation hole 4041 and the second heat dissipation hole 4021, thus improving the efficiency of heat dissipation.

In the above embodiment, the first heat dissipation holes 4041 may be a plurality of arc-shaped heat dissipation holes arranged in an annular shape, and the plurality of arc-shaped heat dissipation holes form a spiral structure, to be adapted to a spiral airflow in the heat dissipation cavity, then a better heat dissipation effect may be realized, and meanwhile, the appearance of the product designed in this way is also more beautiful.

Meanwhile, as shown in FIG. 9, in the above embodiment, the protective box 3 is provided with a sinking step portion 22, and the second heat dissipation hole 4021 is provided in the sinking step portion 22, then better heat dissipation may be achieved. Meanwhile, the design of the sinking step may improve the overall mechanical strength of the protective box. In order to improve the effect of heat dissipation, the second heat dissipation holes 4021 are a plurality of round holes arranged in a form of rectangular array.

As a complementary solution, as shown in FIG. 8, several third heat dissipation holes 42 are provided in a side portion of the base 4. The third heat dissipation holes 42 may be elongated, and uniformly arranged side by side, and the heat dissipation airflow in the heat dissipation cavity passes through the third heat dissipation holes 42, improving the effect of heat dissipation.

As shown in FIGS. 11-16, the present disclosure provides a steam-generator cleaning structure of a steam-type air fryer. A cooking cavity 1 is provided inside the air fryer, a steam generator 2 is provided outside the cooking cavity 1, the steam generator 2 introduces high-temperature steam into the cooking cavity 1, a drain hole 5 in communication with the outside is provided in the steam generator 2, and a port of the drain hole 5 is blocked by a pluggable-type water outlet plug 6.

In the present technical solution, by providing the drain hole 5, a cleaning liquid may be introduced into the steam generator 2. Scale on an inner wall is washed off by the cleaning liquid, and meanwhile, the water outlet plug 6 is removed to discharge sewage through the drain hole 5, so as to realize cleaning of the steam generator 2, thus ensuring the efficiency of the steam generator.

In an embodiment, the water outlet plug 6 includes an installation portion 61 and a blocking portion 63. The installation portion 61 is fixed outside the steam generator 2. The blocking portion 63 blocks the port of the drain hole 5. The installation portion 61 may be connected with a connection hole outside the steam generator 2 through a fastener, or may be in a tapered insertion shape, and inserted into a jack outside the steam generator 2. As the water outlet plug 6 as a whole is made of a rubber material, once the installation portion 61 is installed and fixed, the blocking portion 63 may be plugged or unplugged, and will not be lost after being pulled out.

In an embodiment, a protective box 3 is connected to the outside of the steam generator 2, the protective box 3 may protect the steam generator 2, and also may generate a heat insulation effect on the steam generator 2, to prevent the steam generator 2 from generating a large amount of heat to overheat a shell of the air fryer, and as the protective box 3 encloses the steam generator 2, in order to realize cleaning of the steam generator 2, an extension pipe 51 extending to an outer side wall of the protective box 3 is installed at the drain hole 5. As an extension of the drain hole 5, the extension pipe 51 may lead out sewage in the steam generator 2. Likewise, the water outlet plug 6 includes an installation portion 61 and a blocking portion 63, wherein the blocking portion 63 blocks a port of the extension pipe 51, the installation portion 61 is connected to the protective box 3, and a connection manner between the installation portion 61 and the protective box 3 may be the same as the connection manner in the preceding embodiment.

In the above two embodiments, in order that the blocking portion 63 may be conveniently plugged and unplugged, an outer end portion of the blocking portion 63 is provided with a raised rib as an operation portion 62, and the raised rib may allow an operator to grasp the raised rib with two fingers to unplug the blocking portion 63, which is quite convenient.

Certainly, the operation portion 62 may also be provided in other structures, such as a pull ring and a boss grooved at two sides, as long as the blocking portion 63 is conveniently plugged and unplugged.

In another embodiment, in order to facilitate in operating the water outlet plug 6 from the outside of the air fryer, a body shell of the air fryer is provided with an opening in a position corresponding to the water outlet plug 6, and a detachable water plug cover 7 is installed at the opening, then the water outlet plug 6 may be exposed after the water plug cover 7 is detached, in this way the blocking portion 63 of the water outlet plug 6 may be plugged and unplugged.

As a mounting structure of the water plug cover 7, a side edge of the water plug cover 7 is provided with a clamping plate 72, the clamping plate 72 is clamped with a clamping groove 41 on a side wall of the opening on the body shell, and the other side of the water plug cover 7 is connected to the body shell via a fastener 73. In operation, the water plug cover 7 may be quickly removed just by detaching the fastener 73. The clamping between the clamping groove 41 and the clamping plate 72 may play a role of limiting and aligning. Such a structure may realize rapid disassembly and assembly of the water plug cover 7. Certainly, the water plug cover 7 may also be connected to the body shell in other manners, such as threaded connection, or snap-fit.

As a complement to the structure of the water plug cover 7, a compression rib 71 for compressing the blocking portion 63 of the water outlet plug 6 is provided at an inner side of the water plug cover 7, and the compression rib 71 may tightly press the blocking portion 63, preventing the blocking portion 63 from falling off automatically during operation.

As a preferred solution, the steam generator 2 is installed at the bottom of the air fryer, and the drain hole 5 is provided at the bottom of the steam generator 2, in this way, it is more convenient for the drainage of the drain hole 5, and in use, the water plug cover 7 is installed on the base 4 of the body shell, then the structure is hidden.

Figure 17:
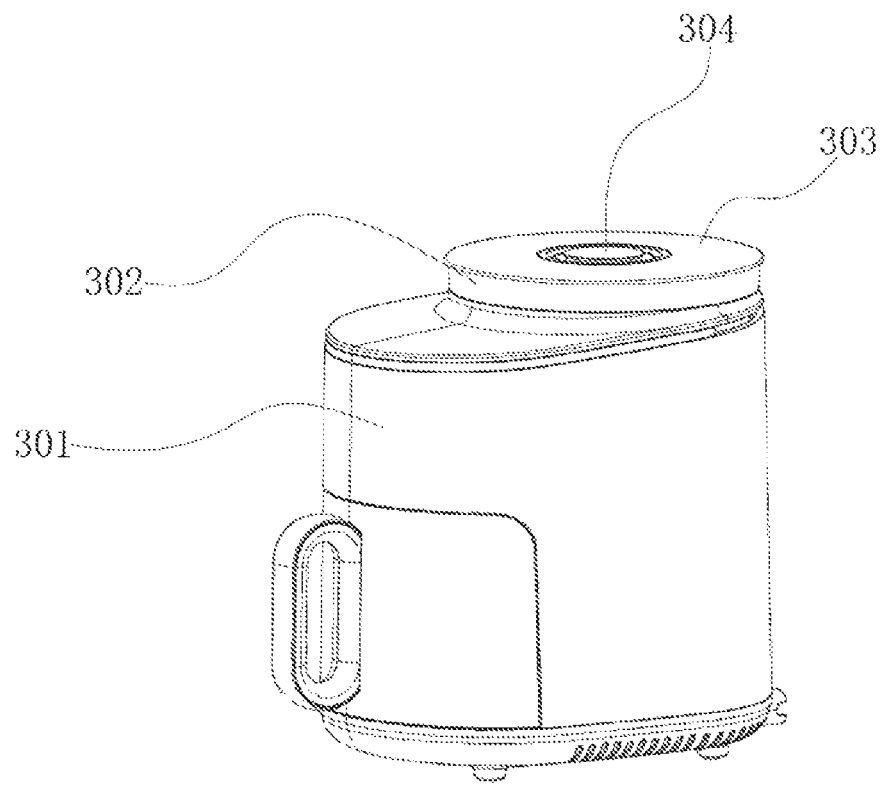
FIG. 17 is a perspective structural view of the steam-type air fryer provided in the present disclosure.
Figure 18:
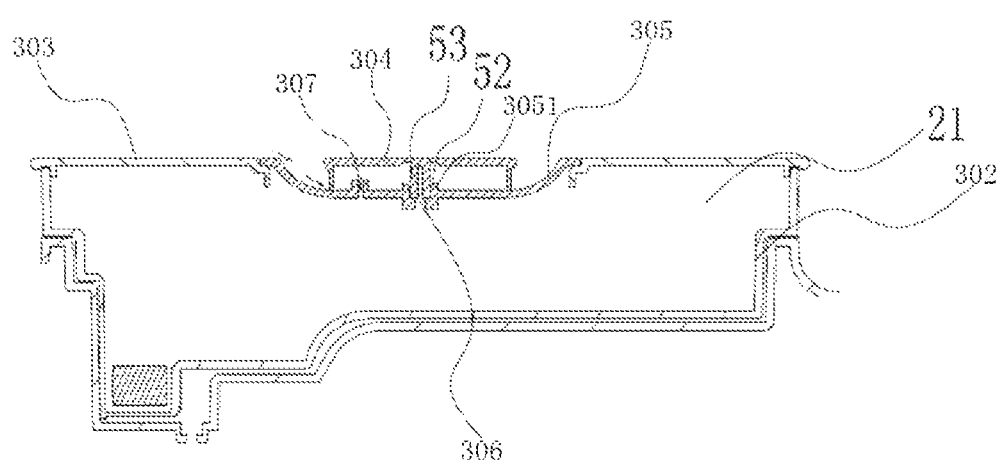
FIG. 18 is a front semi-sectional structural view of the steam-type air fryer provided in the present disclosure.
Figure 19:
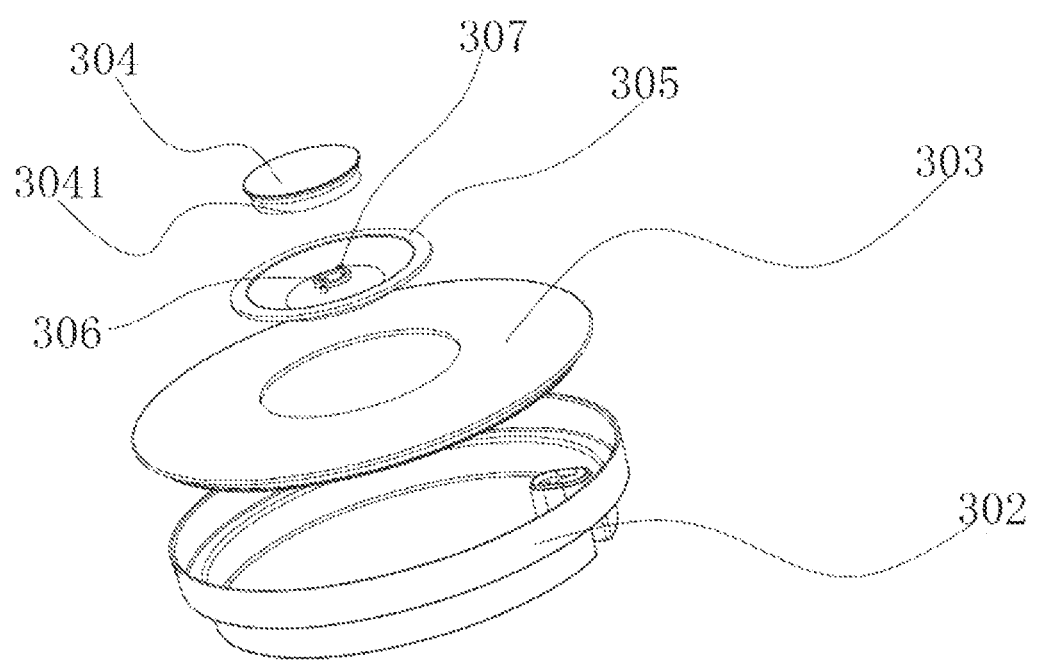
FIG. 19 is a partial exploded structural view of the steam-type air fryer provided in the present disclosure.

As shown in FIGS. 17-19, the present disclosure provides a water tank structure of a steam-type air fryer, including a water tank body 302, installed at an upper side of an air fryer body 301, a top portion of the water tank body 302 is provided with an upper cover 303, a water storage cavity 21 is formed inside the water tank body 302, and the upper cover 303 of the water tank body 302 is provided with an air intake 307 in communication with the water storage cavity 21, so that the inside and the outside of the water tank body 302 are in communication to each other. When the air intake 307 is provided, air pressures inside and outside the water tank body 302 may be allowed to be consistent, so as to ensure that the water in the water tank can be smoothly discharged regardless of the amount of water.

As an installation and connection manner of the upper cover 303, the upper cover 303 is detachably connected to or integrally molded with the water tank body 302. As to the detachable connection, the upper cover may be directly placed on an upper edge opening of the water tank body 302 and may be removed at any time, or the upper cover may be connected to the water tank body 302 in a snap-fit or threaded manner, facilitating the cleaning of the inside of the water tank; and as to the integral molding, the upper cover 303 and the water tank body 302 are formed by one-step processing of a die, with greater overall strength.

Meanwhile, in order to avoid external debris from entering the water tank body 302 through the air intake 307, a shielding structure for covering the air intake 307 is provided at an upper side of the upper cover 303.

In an embodiment, the upper cover 303 is provided thereon with a water tank cover 305, the water tank cover 305 is provided with a water adding port 306, the water tank cover 305 is provided with a shielding cover 304, and the shielding cover 304 shields the water adding port 306. The water may be smoothly added into the water tank through the water adding port 306, and the water adding port 306 may be shielded by the shielding cover 304 when not in use.

As a preferred structure of the water tank cover 305, the water tank cover 305 is inwardly recessed to form a concave cavity, and the water adding port 306 is provided at the bottom of the concave cavity, in this way, when adding water, the water may flow into the water adding port 306 totally along the concave cavity. A bottom surface of the concave cavity may be an arc-shaped surface to prevent water from flowing onto a table when adding water. A peripheral edge of the shielding cover 304 may extend to close to an edge position of the concave cavity, in this way, the appearance is more beautiful when the top of the water tank is seen from the outside.

As shown in FIGS. 18-19, when designing the structure of the water tank cover 305, the air intake 307 also may be provided in the concave cavity of the water tank cover 305, and covered by the shielding cover 304, and the shielding cover 304 is used as a shielding structure of the air intake 307 to make the structure more compact.

When the air intake 307 and the water adding port 306 are both provided in the water tank cover 305, it is possible that at least two air intakes 307 are provided, the water adding port 306 is provided at a center of the water tank cover 305, and the air intakes 307 may be uniformly provided around the water adding port 306.

Meanwhile, for better air permeability of the air intake 307, a bottom of a side wall of the shielding cover 304 abuts against a bottom of the concave cavity, and the side wall of the shielding cover 304 is provided with a penetrating ventilation groove 3041 or ventilation hole.

In another embodiment, in order to avoid debris from flowing into the water tank with water flow, the air intake 307 and the water adding port 306 are both provided on a boss structure 3051, and the boss structure 3051 is higher than the bottom of the concave cavity, in this way, the boss structure 3051 may block the debris outside, and when adding water, the water may enter the water tank simultaneously from the air intake 307 and the water adding port 306, thus the water tank is kept hygienic, and the efficiency of adding water also can be improved.

In a practical application process, the water adding port 306 and the air intake 307 may also be a same hole, in this way, the structure is simpler.

In addition, in order to be capable of positioning the shielding cover 304, a vertically downward insertion post 53 is provided inside the shielding cover 304, the water adding port 306 is also provided in the boss structure 3051, and the insertion post 53 is inserted into the boss structure 3051 where the water adding port 306 is located to block the water adding port 306. The insertion post 53 not only may position the shielding cover 304, but also may prevent the debris from entering the water tank from the water adding port 306 having a relatively large pore diameter when no water is added. Meanwhile, an upper end edge of the water adding port 306 is provided with a conical guide portion 52. The conical guide portion 52 may guide the insertion post 53 during installation, thus it may be convenient to quickly install the shielding cover 304 in place.

Although the present disclosure has been described in the above with reference to the embodiments, various improvements may be made to the present disclosure and components therein may be replaced by equivalents, without departing from the scope of the present disclosure. In particular, as long as there is no structural conflict, various features in the embodiments disclosed in the present disclosure may be used in combination with each other in any manner, while these combinations are not enumerated in the present specification only for the sake of saving space and resource. Therefore, the present disclosure is not restricted to specific embodiments disclosed herein, but covers all technical solutions falling within the scope of the claims.

INDUSTRIAL APPLICABILITY

In the steam-generator cleaning structure of a steam-type air fryer provided in the present disclosure, the steam generator is provided with the drain hole, and the pluggable-type water outlet plug is provided at the drain hole. When the steam generator needs to be cleaned, the washing liquid may be introduced into the steam generator, and the water outlet plug is removed to discharge sewage through the drain hole, so as to realize the cleaning of the steam generator; the water outlet plug includes the installation portion, the blocking portion, and the operation portion, which may realize installation of the water outlet plug, meanwhile, the drain hole may be manually blocked or opened; at the same time, the water outlet plug is made of a heat-resistant elastic rubber material, so as to facilitate the installation thereof, meanwhile, the sealing effect is good; a corresponding water outlet plug cover is provided outside the water outlet plug, and may shield and protect the water outlet plug; the water outlet plug is fixed on the base through clamping in cooperation with a screw, and the fixing is reliable and the disassembly and assembly are convenient; the compression rib on the water outlet plug may compress the blocking portion of the water outlet plug, and ensure that it will not fall off; moreover, the steam generator is disposed at the bottom of the air fryer, and the drain hole is provided at the bottom of the steam generator, thus facilitating the operation of cleaning and discharging the sewage.

In the steam system of a steam-type air fryer provided in the present disclosure, the steam nozzle is provided at the side of the cooking cavity, and the high-temperature steam is directly sprayed near the food, then the cooking effect is better; the steam nozzle is provided below the frying board, and the high-temperature steam is sprayed to the lower part of the food, to render a better steaming and stewing effect of the food; furthermore, the reliable fixing and sealing structure is provided between the steam nozzle and the cooking cavity and the frying pot, ensuring that no steam leakage occurs.

In the steam conveying structure of the steam-type air fryer provided in the present disclosure, the steam conveying structure is designed with a bending included angle, and the steam may collide in the conveying process by utilizing the principle of the bending included angle, to separate the water vapor in the steam, and the separated water vapor may be returned into the steam generator to continue to generate steam, ensuring that the steam finally entering the cooking cavity of the air fryer has a high temperature and a low water content, thus, the cooking efficiency and quality are improved.

In the water tank structure of the steam-type air fryer provided in the present disclosure, the air intake in communication with the internal water storage cavity is provided above the water tank, which may realize that the air pressure in the water tank is kept at unchanged atmospheric pressure, thereby ensuring that the water in the water tank can be smoothly discharged regardless of the amount of water, thus ensuring the practicality of the product; the air intake is provided with the shielding structure, to avoid the debris from entering the water tank through the air intake, and meanwhile also make the appearance unobtrusive; the upper cover of the water tank is provided with the water tank cover, the air intake is also provided in the water tank cover, and the water tank cover is further provided with the water adding port, so that water can be added to the water tank. The water tank cover is detachably provided with the shielding cover, mainly used for shielding the water adding port and the air intake after the water adding is completed, so as to avoid debris from entering the water tank; the water tank cover is in an inwardly recessed structure, and a water inlet is provided at the bottom of the concave cavity, so as to facilitate in adding water; moreover, the air intake and the water adding port are both provided on the boss structure, ensuring that an entrance of the air intake is higher than the bottom of the concave cavity, so that it is not easily blocked by water and other debris to affect the ventilation effect.

In the steam-generator heat dissipation structure of a steam-type air fryer provided in the present disclosure, the steam generator is provided at the bottom of the lower core, and located between the lower core and the base, and the heat dissipation hole corresponding to the steam generator is provided in the base, so as to facilitate the heat dissipation of the steam generator; the protective box is provided outside the steam generator, and may realize positioning and installation of the steam generator, and ensure the reliability of the installation thereof; meanwhile, the corresponding heat dissipation hole is provided in the protective box, and the protective box does not affect the heat dissipation; moreover, between the lower core and the base is the heat dissipation cavity, in which there is the heat dissipation airflow, and the heat dissipation airflow flows out from the heat dissipation hole after flowing through the steam generator, and may take away heat generated by the steam generator during operation, realizing better heat dissipation for the steam generator.

What is claimed is:

1. A steam system of a steam-type air fryer, comprising a cooking cavity provided in the air fryer, wherein a frying pot is provided in the cooking cavity, the air fryer is further provided with a steam generator and a water tank for supplying water to the steam generator, wherein a steam nozzle in communication with the steam generator is installed at a side of the cooking cavity, wherein the steam nozzle passes through the cooking cavity and extends into the frying pot, a frying board is set up in the frying pot, and a steam spraying port of the steam nozzle is located below the frying board, wherein the steam-type air fryer further comprises a steam conveying structure, the cooking cavity and the steam generator are in communication through the steam conveying structure, and the steam conveying structure comprises:

a first steam conveying pipe, which has one end being in communication with the steam generator;

a second steam conveying pipe, which is in communication with the other end of the first steam conveying pipe, wherein an included angle is formed between the second steam conveying pipe and the first steam conveying pipe, so that steam produces collision when entering the second steam conveying pipe from the first steam conveying pipe; and a third steam conveying pipe, wherein the second steam conveying pipe is in communication with the steam nozzle through the third steam conveying pipe, wherein the first steam conveying pipe and the third steam conveying pipe extend in the same direction from positions connected to the second steam conveying pipe, wherein the steam-type air fryer further comprises a steam-generator heat dissipation structure, the cooking cavity is formed by an upper core and a lower core, and the steam-type air fryer further comprises the steam generator, configured to generate high-temperature steam and introduce the high-temperature steam into the cooking cavity, wherein the steam generator is installed between the lower core and a base of the air fryer, and the base is provided with first heat dissipation holes corresponding to the steam generator.

2. The steam system of a steam-type air fryer according to claim 1, wherein a sealing sleeve is provided on an inner wall of the frying pot, wherein the steam nozzle passes through the sealing sleeve, the sealing sleeve is fixed on a side wall of the frying pot by a fixing pressure plate outside the sealing sleeve, the side wall of the frying pot is provided with a step, the step is flush with the fixing pressure plate, and the step and the fixing pressure plate, in combination, support the frying board.

3. The steam system of a steam-type air fryer according to claim 1, wherein a sealing sleeve is provided on an inner wall of the frying pot, wherein the steam nozzle passes through the sealing sleeve, a guide conical surface is provided on a part of the steam nozzle matched with the sealing sleeve, and a conical hole matched with the guide conical surface is provided at an end of the sealing sleeve facing a side wall of the frying pot.

4. The steam system of a steam-type air fryer according to claim 1, wherein a sealing sleeve is provided on an inner wall of the frying pot, wherein the steam nozzle passes through the sealing sleeve, the sealing sleeve is fixed on a side wall of the frying pot by a fixing pressure plate outside the sealing sleeve, wherein a flap is provided on an inner side wall of an inner bore of the sealing sleeve with inner bore allowing the steam nozzle to pass through, and the flap is pushed open by the steam nozzle or is folded to seal the inner bore.

5. The steam system of a steam-type air fryer according to claim 1, wherein a sealing sleeve is provided on an inner wall of the frying pot, wherein the steam nozzle passes through the sealing sleeve, the sealing sleeve is fixed on a side wall of the frying pot by a fixing pressure plate outside the sealing sleeve, wherein an embedding groove is provided at an end of the sealing sleeve away from the side wall of the frying pot, and a crimped portion embedded into the embedding groove is provided at an end of the fixing pressure plate.

6. The steam system of a steam-type air fryer according to claim 1, wherein the first steam conveying pipe is vertically arranged, with a lower end thereof being in communication with a top steam outlet of the steam generator, the second steam conveying pipe is transversely arranged, and the second steam conveying pipe is arranged to be inclined at a certain angle towards one side of the first steam conveying pipe.

7. The steam system of a steam-type air fryer according to claim 1, wherein a protective box is provided outside the steam generator, wherein the protective box is provided with second heat dissipation holes corresponding to a heat generating component of the steam generator, and the second heat dissipation holes are arranged corresponding to the first heat dissipation holes.

8. The steam system of a steam-type air fryer according to claim 1, wherein the first heat dissipation holes are a plurality of arc-shaped heat dissipation holes arranged in an annular shape.

9. The steam system of a steam-type air fryer according to claim 7, wherein the second heat dissipation holes are a plurality of round holes arranged in a form of rectangular array.

10. The steam system of a steam-type air fryer according to claim 1, wherein the steam-type air fryer further comprises a steam-generator cleaning structure, and the steam generator introduces high-temperature steam into the cooking cavity, wherein a drain hole in communication with the outside is provided in the steam generator, and a port of the drain hole is blocked by a pluggable-type water outlet plug.

11. The steam system of a steam-type air fryer according to claim 10, wherein a protective box is connected to outside of the steam generator, an extension pipe extending to an outer side wall of the protective box is installed at the drain hole, the water outlet plug comprises an installation portion and a blocking portion, wherein the blocking portion blocks a port of the extension pipe, and the installation portion is connected to the protective box.

12. The steam system of a steam-type air fryer according to claim 11, wherein an outer end portion of the blocking portion is provided with a raised rib as an operation portion.

13. The steam system of a steam-type air fryer according to claim 12, wherein a body shell of the air fryer is provided with an opening in a position corresponding to the water outlet plug, and a detachable water plug cover is installed at the opening.

14. The steam system of a steam-type air fryer according to claim 13, wherein a compression rib for compressing the blocking portion of the water outlet plug is provided at an inner side of the water plug cover.

15. The steam system of a steam-type air fryer according to claim 1, wherein the steam-type air fryer further comprises a water tank structure, comprising a water tank body, installed at an upper side of an air fryer body, a top portion of the water tank body is provided with an upper cover and a water storage cavity is formed inside the water tank body, wherein the upper cover of the water tank body is provided with an air intake in communication with the water storage cavity, so that inside and outside of the water tank body are in communication to each other.

16. The steam system of a steam-type air fryer according to claim 15, wherein a water tank cover is provided on the upper cover, a shielding cover is provided on the water tank cover, and the air intake is provided in a concave cavity of the water tank cover, and covered by the shielding cover.

17. The steam system of a steam-type air fryer according to claim 16, wherein the air intake is provided on a boss structure, and the boss structure is higher than a bottom of the concave cavity.

\* \* \* \* \*